Figure 1:
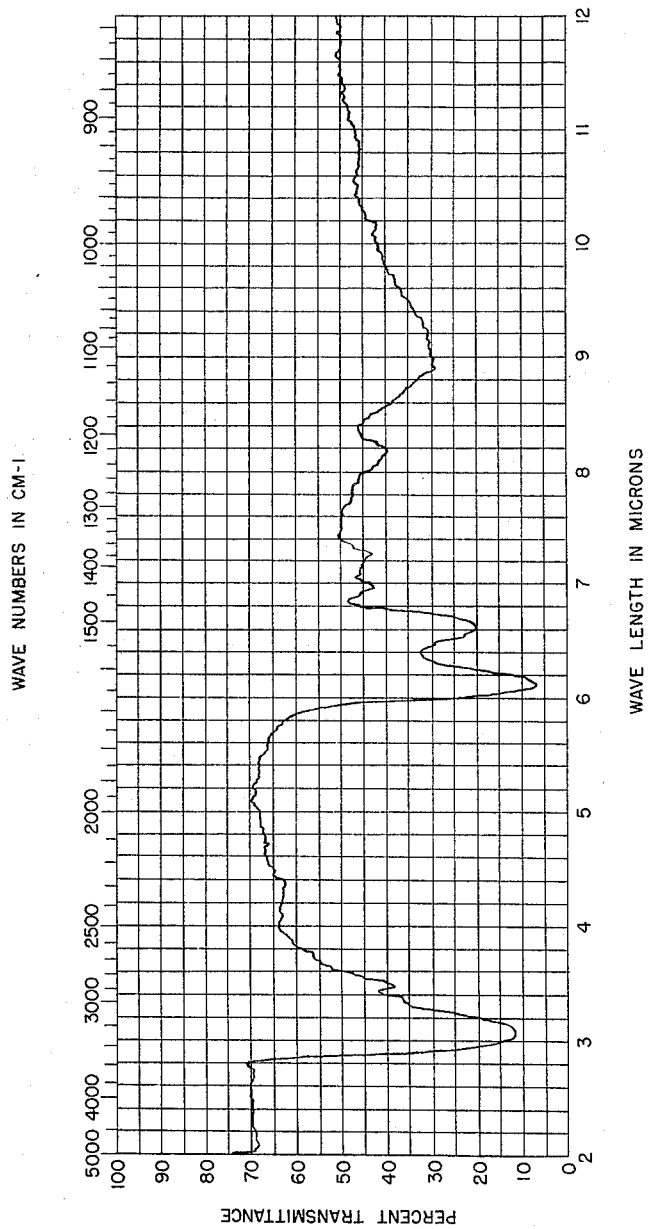

United States Patent Office 3,278,378
Patented Oct. 11, 1966

3,278,378
STAPHYLOCOCCUS-DERIVED ANTIBIOTIC
Charles Alvin Schindler, 1805 College Ave., Fort Worth, Tex., and Vernon Truett Schuhardt, 1005 Gaston Ave., Austin, Tex.
Filed Apr. 19, 1962, Ser. No. 191,664
15 Claims. (Cl. 167—65)

This application is a continuation-in-part of application Serial Number 107,243, filed May 2, 1961, now abandoned.

This invention is concerned with a new and useful antibiotic substance, referred to herein as lytic factor, which is produced by the hitherto undescribed organism *Staphylococcus staphylolyticus*, n.s. Schindler and Schuhardt, with the process for producing this substance by fermentation, methods for its isolation from fermentation broths, and with the treatment of infections with it.

The new species of microorganism, which we have discovered and which produces this antibiotic when cultivated under controlled conditions, was found in the lawn of the Kelly strain of *Staphylococcus aureus* following cultivation thereof after exposure to staphylococcal typing phage No. 6. The microorganism was designated by the number K–6–WI pending taxonomic classification. A viable culture of the living organism has been deposited with the Culture Collection Section, Fermentation Division of the Northern Regional Research Laboratory, Bureau of Agricultural and Industrial Chemistry, United States Department of Agriculture at Peoria, Illinois. It has been assigned catalog No. NRRL B–2628 in that culture collection.

The microorganism proved to be a non-motile, gram positive, non-sporeforming coccus, measuring 1.0–1.2 microns, appearing as singly dispersed cells, pairs, tetrads, chains with not more than four elements, and small clumps. The microorganism is a facultative anaerobe, having a tolerance to high sodium chloride concentrations (12 percent). Glucose is fermented anaerobically with the production of acid. Acid but no gas is produced in 1 percent peptone water containing 1 percent of the following carbohydrates: d-fructose, d-mannose, d(+)galactose, lactose, glucose, and sucrose. Neither acid nor gas is produced with 1(+)arabinose, salicin, inulin, d-sorbitol, d-mannitol, d(+)xylose, glycerine, and maltose. Acid is produced in litmus milk followed by coagulation. The organism cannot utilize ammonium dihydrogen phosphate as the sole source of nitrogen and produces neither caseinase, lipsase, acetylmethyl carbinol, hydrogen sulfide, coagulase, nor rabbit or sheep red blood cell hemotoxins. It produces ammonia and catalase, reduces nitrate, and gives a negative methyl red test. It is not attacked by the 26 basic staphylococcal typing phages.

This organism does not fit the description of any organism listed in Bergey's manual of Determinative Bacteriology, 7th Edition, 1957. It is considered to be a new species. The results of comparative taxonomic tests on *Staphylococcus staphylolyticus* NRRL B–2628 and *S. aureus* (Kelly) from whose lawn it was isolated, indicate significant differences in maltose fermentation, lipase production, coagulase production, toxin production, and staphylococcal phage susceptibility as shown in Tables I and II.

Table I
SUGAR FERMENTATION TESTS FOR SPECIES DIFFERENTATION

| Substrate | Staphylococcus staphylolyticus (NRRL B–2628) | Staphylococcus aureus (Kelly strain) |
|---|---|---|
| 1(+) arabinose (Pfanstiehl) | – | –. |
| Levulose (Difco) | + | +. |
| Salicin (Difco) | – | –. |
| d-Mannose (Difco) | + | +. |
| Inulin (NBC) | – | –. |
| d-Sorbitol | – | Weak. |
| d-Mannitol (Pfanstiehl) | – | Weak. |
| d(+) galactose (Pfanstiehl) | + | +. |
| d(+) xylose (Difco) | – | –. |
| Glycerine (Sargent) | – | Weak. |
| Maltose (Difco) | – | +. |
| Lactose (Difco) | + | +. |
| Glucose (Difco) | + | +. |
| Sucrose | + | +. |
| Litmus milk | +, coagulated | +, coagulated. |

Legend: + Acid. – Neutral or alkaline. No gas was produced.

Table II
OTHER BIOCHEMICAL AND PHYSIOLOGICAL TESTS FOR SPECIES DIFFERENTIATION

| Taxonomic Tests | Staphylococcus staphylolyticus (NRRL B–2628) | Staphylococcus aureus (Kelly strain) |
|---|---|---|
| Ammonium dihydrogen phosphate as sole source of nitrogen. | No growth | No growth. |
| Catalase production | + | +. |
| Gelatin liquefaction (Frazier's medium). | + | +. |
| Proteolytic enzyme production (caseinase). | – | –. |
| Starch hydrolysis | – | –. |
| Lipase production | – | +. |
| Methyl red test | Negative | Negative. |
| Acetylmethyl carbinol production. | – | +. |
| Ammonia production | + | +. |
| Nitrate reduction | + | +. |
| Coagulase production | – | +. |
| Toxin production | – | + (Beta) |
| Hydrogen sulfide production | – | –. |
| Indole test | Negative | Negative. |
| Phage type | Not attacked | 80++/81++/ 52A++/7+/ 52LH+/. |
| Motility | Nonmotile | Nonmotile. |
| Facultative anaerobe | Yes | Yes. |
| Hemolysis of blood agar (human). | – | +. |

Legend: + Produced. – Not produced.

The new antibiotic of the present invention is a proteinaceous bactericidal agent which has the capacity to lyse viable cels, heat-killed cells, and cell walls of bacteria of the genus Staphylococcus other than *S. staphylolyticus* which produces it; it has an isoelectric point of about pH 11; it is heat labile and non-dialyzable; it is hydrolyzed with loss of lytic activity by the enzyme trypsin; and it yields ammonia and various natural α-amino acids on acid hydrolysis. By the term natural α-amino acid is meant α-amino acids that have been previously reported as normal protein constituents. The sedimentation coefficient and the infra red adsorption spectrum of a purified sample of the lytic factor have been determined as hereinafter described. It exhibits maximum absorption in the ultra violet region of the spectrum at 278 m$\mu$. From the value of the sedimentation coefficient and the fact that the substance is non-dialyzable, the substance is estimated to have a molecular weight in the range 20,000 to 30,000.

59 strains of the genus Staphylococcus tested were lysed when subjected to this lytic factor. The substance was further tested for lytic activity against suspensions of 27 additional bacterial species selected from 19 different genera other than Staphylococcus. None of these additional bacteria was lysed. In view of this unusual specificity for Staphylococci and in view of the fact no resistant Staphylococcus other than the specific organism that produces it has been encountered regardless of phage type, antigen composition, or sensitivity to other antibiotics, the novel agent of this invention is useful as a reagent for the rapid taxonomic classification and identification of organisms of the genus Staphylococcus.

A listing of the 59 strains of Staphylococci against which the lytic factor of the present invention has been tested is arranged in Table III. Other species which have been tested and found to be insensitive to this agent are listed in Table IV.

Staphylococcus staphylolyticus [2]
NRRL B-2628
Streptococcus fecalis
Streptococcus lactis
Streptococcus pyogenes (A)
Vibrio chloreae (Inaba strain)
Vibrio cholerae (Ogawa strain)
Salmonella paratyphi
Salmonella schottmuelleri

[1] Heat-killed cells, and viable cells are resistant.
[2] Heat-killed cells, viable cells, and cell walls are resistant.

Suspensions of cells used in testing the susceptibility of various organisms to the lytic factor, and of a standard *S. aureus* culture used for assaying the activity of various lytic factor solutions were obtained from pancreatic digest of caseinsoy broth cultures incubated at 37° C. for 18 hours on a reciprocating shaker operating with a 2.5 inch stroke at 76 cycles per minute. The cells were recovered by centrifuging these cultures at 10,900 r.p.m.

*Table III*

BACTERIA LYSED BY LYTIC FACTOR OF *STAPHYLOCOCCUS STAPHYLOLYTICUS* NRRL B-2628

| Name | Source | No. of Strains Tested | No. of Strains Lysed | Characteristic or History |
|---|---|---|---|---|
| S. aureus | U. of Texas [1] | 2 | 2 | β-hemolytic; coagulase positive. |
| S. aureus | do | 1 | 1 | β-hemolytic; coagulase negative. |
| S. aureus | do | 2 | 2 | α-hemolytic; coagulase positive. |
| S. aureus | do | 2 | 2 | No toxin produced; coagulase positive. |
| S. aureus | do | 4 | 4 | Includes one penicillin and one streptomycin resistant strain. |
| S. aureus | do | 1 | 1 | Coagulase negative. |
| S. aureus | Southwestern Medical School | 12 | 12 | Blair bacteriophage types 52 (LH), 52A/79, 3C, 55, 523, 7, 73, 42E, 42D, 44A(LH), 80, and 81. |
| S. aureus | do | 19 | 19 | Blair bacteriophage type 80/81; coagulase positive; clinical isolates. |
| S. aureus | University of Oklahoma | 2 | 2 | Smith and K93 mouse virulent strains. |
| S. aureus | Eli Lilly and Company | 2 | 2 | Antibiotic resistant clinical isolates. |
| S. aureus | Merck & Co., Inc | 7 | 7 | Do. |
| S. epidermidis | ATCC 155 | 1 | 1 | Incubation for 2 hrs. with lytic agent required. |
| S. epidermidis | Walter Reed Army Medical Center. | 4 | 4 | Clinical penicillinase producing strains from mixed gonococcus-staphylococcus infections. |

[1] The strains from the University of Texas were isolated by students from boils, nasal passages, and throat swabs.

*Table IV*

ORGANISMS NOT LYSED BY LYTIC FACTOR OF *S. STAPHYLOLYTICUS* NRRL B-2628

*Aerobacter aerogenes*
*Bacillus megaterium* [2]
*Bacillus subtilis*
*Bordetella pertussis*
*Brucella abortus*
*Corynebacterium diphtheriae*
 (gravis)
*Corynebacterium diphtheriae*
 (mitis)
*Escherichia coli* [1]
*Gaffkya tetragena*
*Klebsiella pneumonia*
*Lactobacillus plantarum*
*Listeria monocytogenes*
 type I
*Micrococcus lysodeikticus* [2]
*Pasteurella pestis*
*Pasteurella tularensis*
*Proteus morgani*
*Proteus rettgeri*
*Proteus vulgaris*
*Pseudomonas aeruginosa*
*Salmonella typhosa*
 (Panama carrier strain)
*Sarcina lutea*
*Serratia marcescens*

(13,000×G) for 10 minutes, and washed twice with 0.05 M trishydroxymethylaminomethane-HCl (tris) buffer at pH 7.5 with 0.145 M NaCl incorporated in it.

For comparative studies on the lytic activity of *S. staphylolyticus* filtrates and lytic factor concentrates prepared therefrom, a standardized method to give rapid quantitative assays was devised. This method is based on the transmittance of light, as measured by a photoelectric colorimeter (Klett-Summerson) equipped with a 500–570 mµ filter, at intervals of time employing a standard suspension of assay indicator bacterial cells.

The assay indicator organism that was chosen as a standard is *S. aureus* strain FDA 209P. The colorimeter is adjusted to give a reading corresponding to 60% transmittance (110 Klett units) with 0.001 M. barium sulfate. The cells of an 18 hour shake culture of the standard culture are washed twice with 0.05 M tris buffer (pH 7.5) containing sodium chloride and resuspended in this buffer at a concentration yielding a reading corresponding to 25% transmittance (300 Klett units). The addition of 1.5 ml. of this suspension to the measuring tubes containing enough of the tris buffer with or without filtrate to make a total volume of 5.0 ml. yields a suspension having a turbidity of 55% to 57% transmittance (125±5 Klett units).

The assay incubation temperature employed is 37° C. One unit of lytic factor activity is designated as being contained in that amount of sample which causes a 50 percent reduction in turbidity in 10 minutes with respect to a control suspension of *S. aureus* FDA 209P cells which is not exposed to the lytic factor when the test samples are incubated at 37° C.

In order to confirm the validity of the assay as a reflection of reduced bacterial population, experiments were conducted in which bacterial counts of viable organisms in the assay solutions were made at intervals coinciding with the measurement of optical density readings. Bacterial counts were made by the spread plate method. The results revealed that the number of viable organisms decreased in direct proportion to the decrease in optical density.

The cells of an active culture of *S. staphylolyticus* were separated and mechanically disintegrated to determine whether the lytic agent was present within the cell. It was found that the supernate of the disintegrated cells contained no lytic activity. It was therefore concluded that the lytic agent is not retained within the cell but occurs extracellularly in active cultures of *S. staphylolyticus*.

To determine whether or not the rate of lysis of staphylococcal indicator cells is affected by pH, Sorenson's buffer at graded pH values was used as the suspending medium in a series of assay experiments employing *S. aureus* (Kelly) as the indicator organism. Identical amounts of lytic agent (1.0 ml. of a cell free *S. staphylolyticus* NRRL B–2628 filtrate) were then added to each of a series of tubes containing the buffer and the indicator cells, and the tubes were incubated at 37° C. Periodic measurements of light transmittance on the analytical photoelectric colorimeter were made, and the time required for a 50% reduction of turbidity in each tube to occur was determined. The results are arranged in Table V. Lysis was found to take place most rapidly at pH 7.5. This value was confirmed employing other buffer systems such as tris-saline and veronal buffers.

*Table V*

EFFECT OF pH ON LYTIC ACTIVITY

| pH: | Time for 50% reduction of turbidity, min. |
|---|---|
| 6.10 | 65 |
| 6.20 | 50 |
| 6.35 | 35 |
| 6.50 | 25 |
| 6.70 | 16 |
| 6.90 | 15 |
| 7.10 | 12 |
| 7.30 | 11 |
| 7.50 | 7 |
| 7.65 | 8 |
| 7.75 | 9 |
| 7.85 | 10 |
| 7.95 | 11 |

An investigation into the effect of sodium chloride concentration on the ability of the lytic factor of *S. staphylolyticus* to dissolve the *S. aureus* FDA 209P indicator cells revealed that optimum activity is observed at a sodium chloride concentration corresponding to that of an isotonic solution, e.g. 0.145 M sodium chloride. For this investigation, the standard assay procedure was modified by substituting tris pH 7.5 buffer containing various concentrations of sodium chloride for washing and suspending the indicator cells. Five different sodium chloride concentrations ranging from 0 to 0.145 M were employed.

The rate of lysis is also dependent on the temperature of the reaction. This was determined by incubating ten equivalent preparations of *S. aureus* FDA 209P with identical amounts of the lytic factor at temperatures ranging from 34° C. to 55° C. The rate of lysis was observed to increase as the temperature increased up to 50° C. Incubation at 55° C. for 10 minutes or more depressed the rate of lysis, and after 40 minutes at 55° C., no further lysis was observed. Maximum total lysis was obtained within 50 minutes at incubation temperatures between 34° and 40° C. These results show a similarity to biochemical reactions wherein the rate of reaction increases with increasing temperature until either one or both of the reactants is inactivated by heat. It is thought that loss of activity at 55° C. reflects decomposition of the lytic factor illustrating its heat labile character.

*S. aureus* FDA 209P indicator cells were heated at various temperatures in an autoclave and then tested for sensitivity to the lytic factor. The maximum total reduction in turbidity obtainable by action of the lytic factor on such cells is a function of the temperature at which they are heated. Reductions in turbidity observed for heat-treated cultures were not, however, as great as those obtained for viable cultures. Lysis as reflected by reduction in turbidity was more complete when employing cells heated at 65–75° C. than with those heated at 100–121° C. It was, however, quite apparent that the cells were lysed by the lytic factor even after being killed by autoclaving as indicated. It is thought that the relatively incomplete reduction in turbidity with the heat-killed cells as compared to that occurring with viable cultures is due to the presence in the cell suspension of insoluble coagulated proteins resulting from heat treatment of the bacterial indicator cultures.

Cell wall material from *S. aureus* FDA 209P indicator cultures were obtained by mechanical disintegration in a tissue homogenizer. A Mickle Tissue Homogenizer employing No. 13 Ballotini beads operated for 50 minutes at 4° C. was employed. The cell wall material was then recovered as described by Salton and Horne, Biochim. Biophys. Acta, 7, 177–197 (1951) and by Newton, J. Gen. Microbiol. 12, 226–236 (1955). In order to obtain significant turbidity readings in the photoelectric colorimeter with the cell wall material from mechanical disintegration, it was necessary to use an amount of cell wall material corresponding to a much larger number of *S. aureus* indicator cells than is used in the standard assay. Again, as with the autoclaved cells, the total reduction in turbidity obtainable with cell wall material was not as great as for viable cultures. Nevertheless, it was apparent that lysis of the mechanically disintegrated cell wall material occurred.

Experiments were conducted to ascertain the effect of human blood serum on the ability of the lytic factor of *S. staphylolyticus* to destroy viable cells of *S. aureus* FDA 209P. These experiments were carried out according to the assay method described above, but employing appropriate control tubes to allow for the increase in optical density due to the presence of the serum. It was found that there was somewhat of a decrease in the rate of lysis of *S. aureus* FDA 209P by the lytic factor employing 100% serum as the suspending vehicle but that the total extent of lysis was the same as when buffer solution was employed as suspending medium. The maximum reduction in turbidity employing a cell-buffer assay system occurred after 25 minutes while 65 minutes were required for the same reduction in turbidity to result employing a cell-serum preparation for the assay.

Other experiments were conducted involving repeated addition of *S. aureus* indicator cells to assay tubes which has already been employed for lysis of similar sized aliquots of the indicator cells. This was repeated through five consecutive assays with only slight reductions in the rate of lysis. This indicated that the lytic agent was not destroyed in the course of lysing the staphylococcal assay culture. This conclusion was confirmed by demonstrating that a great increase in the rate of lysis occurred in a parallel assay employing the same number of indicator cells but a larger amount of lytic factor. This excluded the possibility that failure for reduced lytic capacity to be observed in the first series of experiments on addition of consecutive aliquots of indicator cells was due to the fact that an excess of the lytic agent was being employed. It was concluded, therefore, that the quantity of lytic agent is neither increased nor exhausted after attack on susceptible bacterial cells.

The rate of lysis of *S. aureus* cells was found to be dependent upon the concentration of lytic factor used. As the concentration of lytic factor is increased, the rate of lysis of a given quantity of staphylococcal cell material increases. A point is eventually reached where cell substrate becomes the limiting factor, and further increases in the amount of lytic factor do not significantly affect the rate nor the amount of lysis.

Four conventional metabolic inhibitors, sodium fluoride, sodium arsenate, sodium azide, and 2,4-dinitrophenol, failed to inhibit the ability of the lytic factor to lyse viable staphylococcal cells. When added to assay tubes of the conventional size in amounts corresponding to 5 micromoles sodium fluoride and sodium arsenate actually increased the rate of lysis while sodium azide and 2,4-dinitrophenol neither increased nor decreased the degree or rate of lysis.

Electrophoretic mobility of a purified preparation was used to evaluate the homogeneity thereof and to determine the isoelectric point of the lytic factor. Duplicate strips of filter paper (Beckman Part No. 300–028) on each of which 0.03 ml. of filtrate assaying 260 units of lytic factor per milliliter was absorbed were placed in the cell of a paper electrophoresis apparatus (Spinco Model R, Series D). Buffers that had an ionic strength of 0.05 M and that covered the pH range 3.6 to 11.4 were selected as the electrolytes. The electrophoresis cell was maintained at 4° C. and operated at a constant current of 10 milliamperes (ma.) for 8 hours. The strips were removed and one of each duplicate strip was heated at 100° C. for 5 minutes and stained for protein with bromophenol blue as described by Dawson et al., [Data for Biochemical Research, Oxford University Press, London (1959)]. To correlate the bio-autogram with the location of the protein, the second duplicate strip was placed, while wet, on a pancreatic digest of casein-soy agar plate that previously had been seeded with *S. Aureus* FDA 209P and incubated for 8 hours. After 45 minutes contact with the agar, the strip was removed and the plate was incubated for an additional 8 hours at 37° C., revealing cell-free zones on the plate corresponding to the location of the lytic factor on the paper.

With buffers ranging from pH 3.6 to pH 10.4, the lytic factor migrated toward the cathode. With the pH 11.4 buffer the lytic factor remained stationary and showed no preference for either anode or cathode. From this it was concluded that the substance has an isoelectric point of about pH 11, or more precisely a value in excess of pH 10.4 and no greater than pH 11.4.

The non-dialyzable nature of the lytic agent is illustrated by the following experiment in which a cell-free fermentation filtrate having an assay of 2.65 units of lytic factor per ml. of the sort described in Example 1 which follows was employed. A 2 ml. of aliquot of this filtrate was dialyzed at 40 C. employing a cellophane membrane (Visking Co.) against 100 times its volume of 0.05 M tris-HCl pH 7.5 buffer. The dialysis was continued for 4 hrs. with the buffer solution being changed each hour. The results of this experiment are arranged in Table VI. The assays of the lytic factor-containing filtrate employed as starting material before and after dialysis are considered to be identical within experimental error.

*Table VI*

DIALYSIS EXPERIMENT

| Material | Increase in Volume on Dialysis, percent | Volume Used for Assay, ml. | Percent Reduction of Turbidity in 10 min. | Assay, total units in Sample |
|---|---|---|---|---|
| Crude filtrate | | 0.4 | 52.5 | 5.30 |
| Dialyzed filtrate | 27 | 0.5 | 50.0 | 5.10 |

Amino acid analysis of the lytic factor was performed in the following manner: To a tube containing 1.0 ml. of purified lytic factor assaying 105 units/ml. and 6.7 mg. protein per milliliter (Example 3), 1.0 ml. of concentrated HCl was added. The mixture was frozen in a solid $CO_2$-acetone bath, and the tube evacuated and sealed. The tube was then heated at 110° C. for 22 hrs., after which the contents were removed and evaporated at 45° C. in a vacuum desiccator containing potassium hydroxide pellets. The powder was resuspended in 5 ml. of 0.20 N citrate buffer (pH 2.20), and analyzed quantitatively and qualitatively for ammonia and amino acid composition in an automatic apparatus. A Spinco Amino Acid Analyzer, Model MS was employed. The operation of this instrument involves absorption of the sample on an ion exchange resin and elution therefrom in a calibrated fashion with continuous photometric analysis of the eluate after treatment with ninhydrin. The results are set forth in Table VII.

*Table VII*

AMINO ACIDS AND AMMONIA FROM ACID HYDROLYSIS OF LYTIC FACTOR

| Product | $\mu$Moles Obtained | Molar ratio relative to half cystine |
|---|---|---|
| Aspartic Acid | 7.13 | 54.4 |
| Threonine | 3.75 | 28.6 |
| Serine | 3.28 | 25.0 |
| Proline | 2.90 | 22.1 |
| Glutamic Acid | 5.45 | 41.6 |
| Glycine | 6.58 | 50.2 |
| Alanine | 4.68 | 35.7 |
| Valine | 3.62 | 27.6 |
| Half Cystine | 0.131 | 1.0 |
| Methionine | 1.84 | 14.0 |
| Isoleucine | 2.60 | 19.8 |
| Leucine | 2.80 | 21.4 |
| Tyrosine | 3.45 | 26.4 |
| Phenylalanine | 1.97 | 15.0 |
| Ammonia | 14.7 | 112.1 |
| Lysine | 2.65 | 20.2 |
| Histidine | 2.08 | 15.9 |
| Arginine | 1.31 | 10.0 |

Animal protection tests were conducted on 32 female C3H mice. Each was infected intraperitoneally with $1 \times 10^8$ cells of *S. aureus* Sv. These animals were treated intraperitoneally with lytic factor of *S. staphylolyticus* in groups of four each. Ten units of the lytic factor were administered to each mouse in six of the groups at time intervals ranging from 2 hours before to 4 hours after infection. One group received 20 units per mouse of lytic factor 1 hour after infection. One infected control group received no therapy. Two uninfected control groups received 10 and 20 units per mouse of the lytic factor, respectively. Three of the four infected control mice were dead in less than 24 hours. Only one of the treated animals died and this animal received 20 units of lytic factor. None of the eight uninfected lytic factor controls died.

To quantitatively estimate the virulence of the infecting strain, one of the infected control mice from the above experiment was autopsied and a peritoneal cavity swab was cultured for recovery of the *S. aureus* culture. This freshly isolated virulent *S. aureus* strain was inoculated to 28 male C3H mice in groups of four each. The intraperitoneal inocula ranged in size from 0.1 to 0.2 ml. and the number of cells injected ranged from $2 \times 10^6$ to $1 \times 10^8$. The $LD_{50}$ of the infecting *S. aureus* culture was thus established to be in the neighborhood of $1.5 \times 10^7$ cells.

A second series of animal protection tests was run with 36 male C3H mice. Each was infected intraperitoneally with a 0.1 ml. inoculum containing five times the $LD_{50}$ amount ($7.5 \times 10^7$ cells) of the *S. aureus* Sv. culture. Twelve mice in groups of 4 each, were treated subcutaneously with 10, 7.5, or 5 units of lytic factor each, 15 minutes after intraperitoneal infection. Sixteen mice, in groups of four each, were treated intraperitoneally with 7.5, 5, 2.5, or 1 unit of lytic factor each 1 hour after intraperitoneal infection. One control group of eight infected mice received no treatment. All eight of the untreated controls were dead in less than 11 hours. One of the four subcutaneously treated mice in the 7.5 unit treatment group died between 96 and 120 hours after treatment. All other treated mice in both the subcutaneous and intraperitoneal treatment groups were alive and apparently normal following one week of observation.

The intraperitoneal $LD_{50}$ of the lytic factor for C3H strain mice was ascertained to be 30 units per animal. Further tests to determine the intraperitoneal and subcutaneous therapeutic index were conducted with mice of the C3H strain infected intraperitoneally with an inoculum of five $LD_{50}$ of *S. aureus* Sv. culture. Results of 2 hour post-infection intraperitoneal therapy (using 0.1 ml. injections) are set forth in Table VIII. These results indicate an intraperitoneal therapeutic index of approximately 3,000 (30/0.01).

*Table VIII*

FOURTEEN DAY POST-TREATMENT RESULTS OF TWO HOUR POST-INFECTION INTRAPERITONEAL THERAPY WITH LYTIC FACTOR.

| Units of lytic factor injected: | Number of survivors/ number infected |
|---|---|
| 1.0 | 4/4 |
| 0.5 | 4/4 |
| 0.1 | 4/4 |
| 0.05 | 7/7 |
| 0.02 | 4/4 |
| 0.01 | 3/4 |
| 0.005 | 0/4 |
| None | 1/8 |

The results of 1 hour post-infection, subcutaneous therapy are set forth in Table IX. These results indicate that the subcutaneous therapeutic index is approximately 60, assuming that the $LD_{50}$ of the lytic factor is similar by subcutaneous injection and intraperitoneal injection.

*Table IX*

FOURTEEN DAY POST-TREATMENT RESULTS OF ONE HOUR POST-INFECTION SUBCUTANEOUS THERAPY WITH LYTIC FACTOR

| Units of lytic factor injected: | Number of survivors/ number infected |
|---|---|
| 5.0 | 8/8 |
| 2.5 | 2/4 |
| 1.0 | 2/5 |
| 0.5 | 6/12 |
| None | 1/8 |

In view of the all encompassing capability of the lytic factor to destroy organisms of the genus *Staphylococcus* established by the in vitro tests described, the foregoing animal protection studies and toxicity determination are considered to demonstrate the utility of the lytic factor of the present invention in treating infections caused by organisms of the genus Staphylococcus. *S. staphylolyticus* which produces the lytic factor is, of course, resistant to it. However, insofar as we have been able to ascertain, *S. staphylolyticus* is a nonpathogenic organism and, therefore, is not of concern as an etiologic agent of infections.

Since the lytic factor functions by disrupting cell wall material, the crux of making use of it is to contact the infecting organism with the lytic factor. Any physical means compatible with good pharmaceutical or hospital practice for achieving such contact may be employed. The simplest means, of course, is to simply apply the antibiotic to the infected tissue. This, of course, suggests topical application for infections of the skin or other accessible structures such as the mucus membranes. For this purpose ointments, solutions, suspensions, salves, suppositories, vaginal tablets, lozenges, etc., may be employed. The lytic factor is useful as a disinfectant and a therapeutic agent.

The invention includes within its scope processes for growing lytic factor producing strains of the microorganism *S. staphylolyticus*. Cultivation of the microorganism preferably is conducted in aqueous nutrient media at temperatures of about 30-40° C. and preferably 34–40° C. Nutrient media which are suitable for these processes include dextrose or other similar carbohydrate nutrients such as fructose, sucrose, lactose, and dextrins from hydrolysis of starch, a source of organic nitrogen such as peptone, other hydrolyzed proteins preferably enzymatically hydrolyzed protein such as pancreatic digest of casein, and papaic digest of soy meal. If excessive foaming is encountered during the fermentation, anti-foaming agents such as vegetable oils, higher alkanols, and silicones may be added to the fermentation medium as is conventionally done in submerged aerobic fermentation practice.

For large scale production, the organism is best grown under submerged conditions of agitation and aeration. Inoculum may be obtained by employing a growth from slants or shake flasks inoculated with *S. staphylolyticus*. This growth may be used to inoculate inoculum tanks which in turn may be employed to inoculate large fermenters.

The fermentation is preferably conducted at about pH 7.5 or at least within the range pH 7.3 to 7.7. Since the organism produces acid on glucose utilization, it is preferable to periodically measure the pH of the fermentation medium and to neutralize the fermentation with a suitable base such as sodium hydroxide if the medium becomes more acidic than pH 7.3. It has been observed that after antibiotic production has reached a maximum, the pH tends to become more alkaline. For maximum yield it is advantageous to interrupt the fermentation before the mixture becomes more basic than pH 7.7, since increasing losses in potency occur when the pH exceeds 7.7.

The assay procedure described above is employed periodically to ascertain the extent to which the fermentation has proceeded. Since assay can be conducted in a short period of time, 10 or 15 minutes, and it is possible to quickly ascertain the stage of antibiotic production in any given fermentation period, the fermentation period is determined by the lytic factor assay measured in this fashion. Periods ranging from about 12 to 36 hrs. or longer have been found satisfactory. The period required is related to the temperature of the fermentation, the size of the inoculum, etc., longer periods being required for lower temperatures and smaller inocula.

It is to be understood that the present invention embraces the use not only of the organism *S. staphylolyticus* NRRL B–2628 of the above description, which is given merely for illustrative purposes, but it also embraces use of mutants produced from the described organism by means such as X-ray irradiation, ultra violet irradiation, treatment with nitrogen mustards or other chemical or physical mutagenic agents, through genetic crossing, and the like. It is further to be understood that the invention includes the use of subcultures obtained by various standard microbiological techniques such as single colony isolation methods. Such mutants or subcultures may differ in certain respects from the above described culture. It also includes the use of organisms of this species isolated from other sources.

Since the lytic factor of *S. staphylolyticus* appears to be a protein or protein-like material, it may be recovered by application of many of the techniques employed in the isolation of enzymes from dilute solutions. As a first recovery step the bacterial cells of *S. staphylolyticus* are removed by centrifugation or other convenient means. Protein material containing the antibiotic activity is then precipitated by treatment of the cell-free broth with hydrophilic agents such as inorganic and organic salts which have a high water solubility. Such salts include ammonium sulfate, sodium sulfate, ammonium bromide, ammonium carbonate, ammonium dithionate, and ammonium formate.

After precipitation of the antibiotic and other protein material from the cell-free fermentation broth, various other techniques such as partition chromatography and other forms of chromatography in combination with such refined techniques as electrophoresis, paper chromatography, and solvent extraction may be employed.

Other means for recovery of the antibiotic such as dialysis are also useful as illustrated hereinafter. Another dialysis technique that has application in the recovery of the lytic factor is that of J. Kohn (Nature, April 11, 1959, p. 1055) which involves placing the solution of the lytic factor in a container and introducing into the container a cellophane bag containing a hydrophilic substance such as dextran or polyethylene glycol. The water is absorbed through the membrane by the hydrophilic substance and when carried to completion, only non-dialyzable material including the lytic factor remains in the container and the water is removed by the hydrophilic absorbent in the cellophane bag.

The invention includes the antibiotic in dilute solutions as crude concentrates such as from fermentation sources and in purified forms. The dilute forms such as cell-free fermentation broths are, of course, the least expensive and may, therefore, be considered advantageous forms for certain uses such as in disinfectant and veterinary applications.

Referring again to Table VII of acid hydrolysis products, a mixture of ammonia and known natural α-amino acids was obtained consistent with the conclusion that the lytic factor is proteinaceous in nature. The amino acids cysteine and cystine appear to be present, if at all, only in small amount. To emphasize this comparison, molar ratios of the hydrolysis products relative to half-cystine are given in the table. The results are reported as half-cystine due to the fact that the method does not differentiate between cysteine and cystine in the original sample. The relatively large amount of ammonia obtained is thought to result in part from hydrolysis of glutamine and asparagine which in turn are converted to glutamic acid in the process. The latter were also found in high concentration relative to half-cystine. Tryptophane, if present, is not detected by this method due to destruction thereof under the acid conditions employed for hydrolysis.

The following examples are provided for illustrative purposes only and are not to be considered as limiting the invention.

*Example 1.*—A fermentation medium having the following composition is prepared and 1000 ml. thereof is inoculated with *Staphylococcus staphylolyticus* NRRL B–2628 and incubated for approximately 18 hrs. at 37° C. in Fernbach flasks on a reciprocating shaker operating with a 2.5″ stroke at 76 cycles per minute.

| Component: | Grams per liter |
| --- | --- |
| Pancreatic digest of casein [1] | 17.0 |
| Papaic digest of soya meal [2] | 3.0 |
| Sodium chloride | 5.0 |
| Dipotassium acid phosphate | 2.5 |
| Dextrose | 2.5 |

[1] Trypticase—Baltimore Biological Laboratory.
[2] Phytone—Baltimore Biological Laboratory.

Prior to inoculation the culture medium is adjusted to pH 7.3 with aqueous sodium hydroxide.

After incubation for 18 hrs. the pH rises to 7.5. The culture cells are then removed by centrifugation at 4° C. in a refrigerated centrifuge (Lourdes LRA) at 9000 r.p.m. (13,200×G) for 20 min. The clear supernatant liquid is then filtered through a cellulosic membrane filter having pore diameter 0.5 microns (Schleicher and Schuell Bac-T-Flax) to insure sterility. The clear, yellow filtrate obtained is assayed as described above and found to contain 2.5 units/ml. of lytic factor.

Other well-known carbohydrates may be substituted for dextrose in the fermentation medium of Example 1 without deleterious effect. Similarly, other nitrogen sources such as meat extract and various other well-known enzymatically hydrolyzed proteins may be substituted for the Trypticase and Phytone. Corn steep liquor as a source of carbohydrate and nitrogenous nutrients may also be employed.

*Example 2.*—The process of Example 1 is repeated, substituting the brain-heart infusion medium described in National Formulary IX as the fermentation medium. This medium has the following compositions:

| Component: | Grams per liter |
| --- | --- |
| Calf brain, infusion from | 200 |
| Beef heart, infusion from | 250 |
| Pancreatic digest of gelatin [1] | 10 |
| Sodium chloride | 5 |
| Disodium acid phosphate | 2.5 |
| Dextrose | 2.0 |

[1] Gelysate—Baltimore Biological Laboratory.

The filtered cell-free fermentation filtrate is found to have an assay of lytic factor of about 0.5 units per ml.

A brain-heart infusion medium may be substituted in Example 2 with substantially similar results.

*Example 3.*—The culture medium of Example 1, 2.7 l., is inoculated with *Staphylococcus staphylolyticus* NRRL B–2628 and incubated at 37° C. for 27 hrs. in Fernbach flasks on a reciprocating shaker as described in that example. By this time the pH of the culture medium rises to 7.5. The culture cells are removed by centrifugation as described in Example 1 and the supernatant liquid chilled in an ice-salt bath in a container provided with a mechanical stirrer.

Reagent grade crystalline ammonium sulfate is added slowly to the supernatant liquid with stirring until an amount of ammonium sulfate has been dissolved therein corresponding to 65% saturation. The pH is maintained at 7.5 during the addition. The mixture is kept for 1 hr. at 4° C., during which time a precipitate forms. The precipitate is collected by centrifugation in a refrigerated centrifuge at 2–3° C. The supernatant liquid is decanted and the precipitate is dissolved in 40 ml. of cold 0.05 M tris - (hydroxymethyl)aminomethane hydrochloride pH 7.5 buffer (tris-HCl). The solution is then placed in a cellophane dialysis bag (Visking Co., Division of Union Carbide Corp., New York, N.Y.), and dialyzed free of sulfate ion. The dialysis is carried out at 4° C.

The sulfate-free solution of the lytic factor, 75 ml., is transferred from the dialysis bag to an anion exchange column 2.5 cm. in diameter and 25 cm. long packed with diethylaminoethyl cellulose (Selectacel, Type 40, Brown Co., Berlin, New Hampshire). The column is then developed with tris-HCl buffer containing sodium chloride and chilled to 4° C. The sodium chloride concentration at the start of column development is 0.05 molar and is increased in stages during development to 0.145 molar. The eluate is collected in fifteen 17 ml. fractions, each of which is assayed for lytic factor and protein content. Fractions 8 through 10 are found to have the highest ratio of lytic factor assay to protein concentration determined by the method of Lowry et al., J. Biol. Chem. 193, 265–275 (1951) and are combined for further isolation steps.

Protein material is precipitated from the combined fractions with special enzyme grade ammonium sulfate as described above. A final concentration of ammonium sulfate corresponding to 80% of saturation is employed. The precipitated material is collected by centrifugation at 2–3° C. and 16,000×G for 20 min.

The precipitated material is dissolved in 1.5 ml. of cold 0.05 M potassium phosphate pH 7.0 buffer and dialyzed at 4° C. for 24 hrs. against multiple changes of fresh buffer solution. The solution of the lytic factor is then removed from the dialysis bag and centrifuged in a refrigerated ultra centrifuge (Spinco Model L) at 39,000× G for 20 min. to remove traces of particulate matter and stored at −20° C. The liquid concentrate assays 105 u./ml. of lytic factor and 6.7 mg./ml. protein, or 15.7 units of activity per milligram of protein.

For the purpose of determining the sedimentation constant of the lytic factor which is related to molecular weight, purified material prepared as described in Example 3 and having the assay given there is subjected to 59,780 r.p.m. (254,500×G) at 5±0.1° C. in an analytical ultracentrifuge (Spinco Model E) and the sedimentation boundary photographed at intervals of time. From this data the sedimentation coefficient ($S_{20}$,w) was calculated to be 2.35 S.

*Example 4.*—The procedure of Example 3 is repeated through the first ammonium sulfate precipitation and dialysis step using 0.05 molar tris-HCl buffer. The sulfate-free solution of the lytic factor is then transferred to a synthetic polysaccharide chromatographic column (Sephadex G25, Aktieselskabet Pharmacia, Upsala, Sweden). The column is developed with tris-HCl buffer, 0.05 M. to 0.145 M., in sodium chloride. In this instance extensive development of the column is not necessary, since the lytic factor is not absorbed thereon but passes through at once. Elution is necessary only to the extent required to flush the original solution through the column. Impurities are, however, retained on the column. Protein material is then precipitated from the eluate for recovery of the product as before.

*Example 5.*—Beef extract nutrient agar plates are streaked with the organism *Staphylococcus staphylolyticus* NRRL B–2628 and cross-streaked with various strains of *Staphylococcus aureus*. After incubation at 37° C. for 7 hrs., areas of lysis are observed on the growth of the *Staphylococcus aureus* cross-streaks at the points of intersection. As the incubation time is continued, the areas of lysis increase in size, indicating that the medium sustains the production of the lytic factor by *Staphylococcus staphylolyticus*.

Ten different strains of *Staphylococcus aureus* having the following phage types were employed in this procedure: 80, 81, 52A, 7, 6, and 42D. Lysis was observed in each instance.

*Example 6.*—The procedure of Example 3 is repeated through the column chromatography step. Tris-saline buffer, 0.05 M., and pH 7.5, is used in place of the phosphate buffer in the second dialysis step. Traces of particulate matter are removed by centrifugation as before, yielding a product assaying 260 units of lytic factor per ml. and 4.3 mg. of protein per ml. To each of two test tubes containing 3.5 ml. of 0.05 M. tris-saline buffer (pH 7.5) is added 00.1 ml. of this highly purified preparation of the lytic factor. One of these tubes serves as a control, and 5 mg. of trypsin (Nutritional Biochemical Corp., Cleveland, Ohio) is added to the other tube and both tubes are incubated at 37° C. for 20 min. They are each then assayed for lytic activity according to the method described above.

In the experiment of Example 6, it was found that the tube incubated with trypsin was completely devoid of lytic factor activity while the control tube exhibited a 58% reduction in turbidity in 5 min. corresponding to the anticipated lytic activity based on the original assay of the sample employed in the experiment.

The solution of lytic factor which had been employed in the analytical ultracentrifuge determination of sedimentation coefficient (Example 3) was dialyzed at 4° C. against deionized water until ionic components of the phosphate buffer were removed. The sample was then removed from the dialysis bag, frozen, and dried from the frozen state. A 1% dilution thereof in potassium bromide was compressed into a pellet in the usual fashion and the infrared absorption spectrum determined. Characteristic absorption of the lytic factor was observed at the following wave lengths: 2.8, 3.1, 3.4, 3.5, 5.1, 6.1, 6.4, 6.6, 6.8, 7.0, 7.1, 7.3, 7.4, 8.2, 8.4, and 8.9 microns. A tracing of the infrared absorption curve is attached hereto as FIGURE 1.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

What is claimed is:

1. The process of producing an antibiotic substance by cultivation of a lytic factor producing strain of the organism *Staphylococcus staphylolyticus* on an aqueous nutrient medium until substantial lytic activity for species of Staphylococcus other than *S. staphylolyticus* is imparted thereto.

2. The process which comprises cultivating a lytic factor producing strain of the microorganism *Staphylococcus staphylolyticus* on an aqueous nutrient medium containing assimilable sources of carbohydrate and nitrogen until substantial lytic activity for species of Staphylococcus other than *S. staphylolyticus* is imparted thereto.

3. The process of claim 2 wherein *Staphylococcus staphylolyticus* NRRL B–2628 is employed.

4. The process of claim 2 wherein the assimilable nitrogen source is a peptone.

5. The process of claim 2 wherein the assimilable nitrogen source is an enzymatically hydrolyzed protein.

6. The process of claim 2 wherein the assimilable nitrogen source is pancreatic digest of casein.

7. The process of claim 2 wherein the assimilable nitrogen source is papaic digest of soy meal.

8. The process of claim 2 wherein cultivation is carried out at 30 to 40° C.

9. The process of claim 2 wherein cultivation is carried out at pH 7.3 to 7.7.

10. The process of claim 2 wherein lytic factor is recovered by separating microbial cellular material from resulting fermentation broth and treating resulting aqueous cell-free solution with sufficient of a water soluble hydrophilic salt reagent to cause said lytic factor to precipitate.

11. The process of claim 10 wherein said hydrophilic salt reagent is ammonium sulfate.

12. The antibiotic product produced by the process of claim 1.

13. The antibiotic product comprising the cell-free sterile aqueous solution after separating microbial cellular components from the fermentation broth resulting from cultivation of a lytic factor producing strain of *Staphylococcus staphylolyticus* on an aqueous nutrient medium until substantial lytic activity for species of Staphylococcus other than *S. staphylolyticus* is imparted thereto.

14. The process of destroying microorganisms of the genus Staphylococcus which comprises contacting said microorganisms with an effective amount of the lytic factor of *Staphylococcus staphylolyticus* produced by the method of claim 1.

15. The process of treating tissue infected by microorganisms of the genus Staphylococcus which comprises applying an effective amount of the lytic factor of *Staphylococcus staphylolyticus* produced by the method of claim 1 to the infected tissue.

References Cited by the Examiner

Levi et al.: Science 64–65, January 13, 1956.

Waksman: Microbial Antagonisms and Antibiotics Substances, pages 103–104, 345, 350, 354, and 366, Pub. by the Commonwealth Fund Inc., 1947.

JULIAN S. LEVITT, *Primary Examiner.*

SAM ROSEN, *Assistant Examiner.*